United States Patent
Jovicevic

(10) Patent No.: US 11,639,151 B2
(45) Date of Patent: May 2, 2023

(54) SEAT BELT POSITIONING MECHANISM

(71) Applicant: Nissan North America, Inc., Franklin, TN (US)

(72) Inventor: Niko Jovicevic, Ann Arbor, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 470 days.

(21) Appl. No.: 16/852,111

(22) Filed: Apr. 17, 2020

(65) Prior Publication Data

US 2021/0323498 A1   Oct. 21, 2021

(51) Int. Cl.
- *B60R 22/18* (2006.01)
- *B60R 22/12* (2006.01)
- *B60N 2/64* (2006.01)
- *B60N 2/68* (2006.01)

(52) U.S. Cl.
CPC ............ *B60R 22/12* (2013.01); *B60N 2/64* (2013.01); *B60N 2/68* (2013.01)

(58) Field of Classification Search
CPC .. B60N 2/688; B60R 2022/1818; B60R 22/26
See application file for complete search history.

(56) References Cited

U.S. PATENT DOCUMENTS

| | | | |
|---|---|---|---|
| 4,109,962 A * | 8/1978 | Magyar | B60R 22/26 297/480 |
| 5,681,081 A * | 10/1997 | Lindner | B60N 2/4221 297/483 |
| 8,302,994 B2 * | 11/2012 | Ko | B60R 13/02 280/801.1 |
| 8,459,748 B2 | 6/2013 | Jovicevic | |
| 10,449,926 B2 * | 10/2019 | Yamabe | B60N 2/919 |
| 10,933,781 B2 * | 3/2021 | Yang | B60N 2/688 |
| 2008/0054703 A1 * | 3/2008 | Okazaki | B60N 2/688 297/483 |
| 2018/0279791 A1 * | 10/2018 | Iwakata | B60R 22/26 |
| 2018/0370482 A1 * | 12/2018 | Tago | B60N 2/64 |
| 2020/0398718 A1 * | 12/2020 | Watanabe | B60N 2/5816 |

FOREIGN PATENT DOCUMENTS

WO   WO-2020216902 A1 * 10/2020 ........... B60N 2/6009

* cited by examiner

*Primary Examiner* — James A English
(74) *Attorney, Agent, or Firm* — Global IP Counselors, LLP

(57) ABSTRACT

A seat belt positioning mechanism that has a vehicle seat and an elastic tensioning member. The vehicle seat has a frame structure, a cushion portion covering the frame structure and a cover material covering the cushion portion. The cushion portion defines a main seating section and an outboard side seat section extending laterally outboard from a corresponding side of the main seating section. The side seat section defines an opening extending through the cushion portion. The opening is dimensioned to receive a seat belt extending therethrough. The cover material has a cover extension extending into the opening. The elastic tensioning member has a first end fixed to the frame structure and extends under the cover extension into the opening. The elastic tensioning member is dimensioned and shaped to bias the cover extension in an outboard direction against a part of the seat belt located within the opening.

16 Claims, 5 Drawing Sheets

SEAT BELT POSITIONING MECHANISM

BACKGROUND

Field of the Invention

The present invention generally relates to a seat belt positioning mechanism. More specifically, the present invention relates to seat belt positioning mechanisms that includes a biasing member that positions the seatbelt that extends through an opening of a seat assembly.

Background Information

Seat belts generally extend over the thighs of a passenger seated in a vehicle seat assembly. However, when a smaller passenger is seated in on a wide seat assembly, the belt might not fit comfortably due to the seat assembly and seat belt being designed for larger passengers.

SUMMARY

One object of the present disclosure, is to provide a seat assembly with an opening that includes a seat belt positioning mechanism with a portion of a seat belt extending through the opening such that the seat belt positioning mechanism biases the seat belt into locations that improve comfort of a seated passenger.

In view of the state of the known technology, one aspect of the present disclosure is to provide a seat belt positioning mechanism with a vehicle seat and an elastic tensioning member. The vehicle seat has a frame structure, a cushion portion covering the frame structure and a cover material covering the cushion portion. The cushion portion defines a main seating section and an outboard side seat section extending laterally outboard from a corresponding side of the main seating section. The side seat section defines an opening extending through the cushion portion. The opening is dimensioned to receive a seat belt extending therethrough. The cover material has a cover extension extending into the opening. The elastic tensioning member has a first end fixed to the frame structure and extends under the cover extension into the opening. The elastic tensioning member is dimensioned and shaped to bias the cover extension in an outboard direction against a part of the seat belt located within the opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
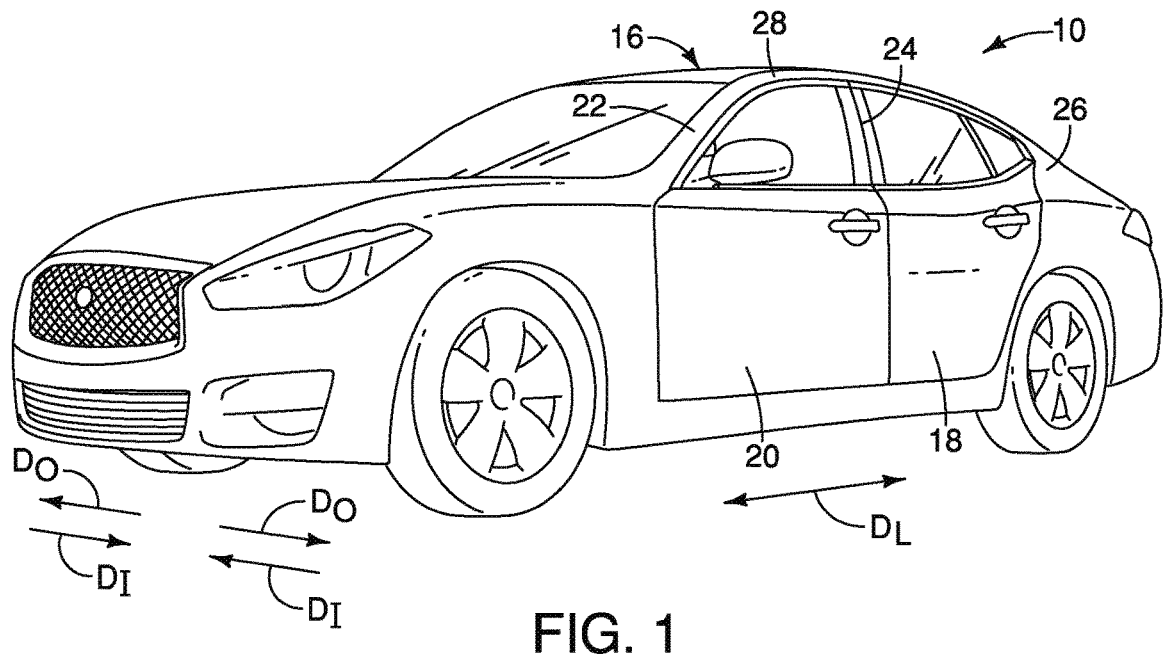
FIG. 1 is a perspective view of a vehicle that includes a passenger compartment having a rear seat with a seat belt positioning mechanism in accordance with an exemplary embodiment.

Referring initially to FIG. 1, a vehicle 10 that includes a seat assembly 12 (FIG. 2) with a seat belt positioning mechanism 14 is illustrated in accordance with a first embodiment.

As shown in FIG. 10, the vehicle 10 includes a vehicle body structure 16, with rear doors 18, front doors 20, pillar structures 22, 24 and 26, a roof structure 28 and a floor structure 30 (FIG. 2) within a passenger compartment within the vehicle body structure 16 of the vehicle 10.

As shown in FIG. 1, the vehicle 10 defines a plurality of relative direction. Specifically, the vehicle 10 defines a lengthwise or longitudinal direction $D_L$ that is defined as extending from frontward of the vehicle 10 to rearward of the vehicle 10 parallel to or co-axial with a center line (not shown) defined by the vehicle 10. Further, as shown in FIG. 1, inboard directions $D_I$ and outboard directions $D_O$ relative to the center of the vehicle 10. The inboard directions $D_I$ and outboard directions $D_O$ are perpendicular to the longitudinal direction $D_L$ but may deviate from perpendicular by any value between 1 degree and 10 degrees, or 1 and 20 degrees or 1 degree to 44 degrees and still be considered inboard directions $D_I$ and outboard directions $D_O$ relative to the longitudinal direction $D_L$.

Figure 2:
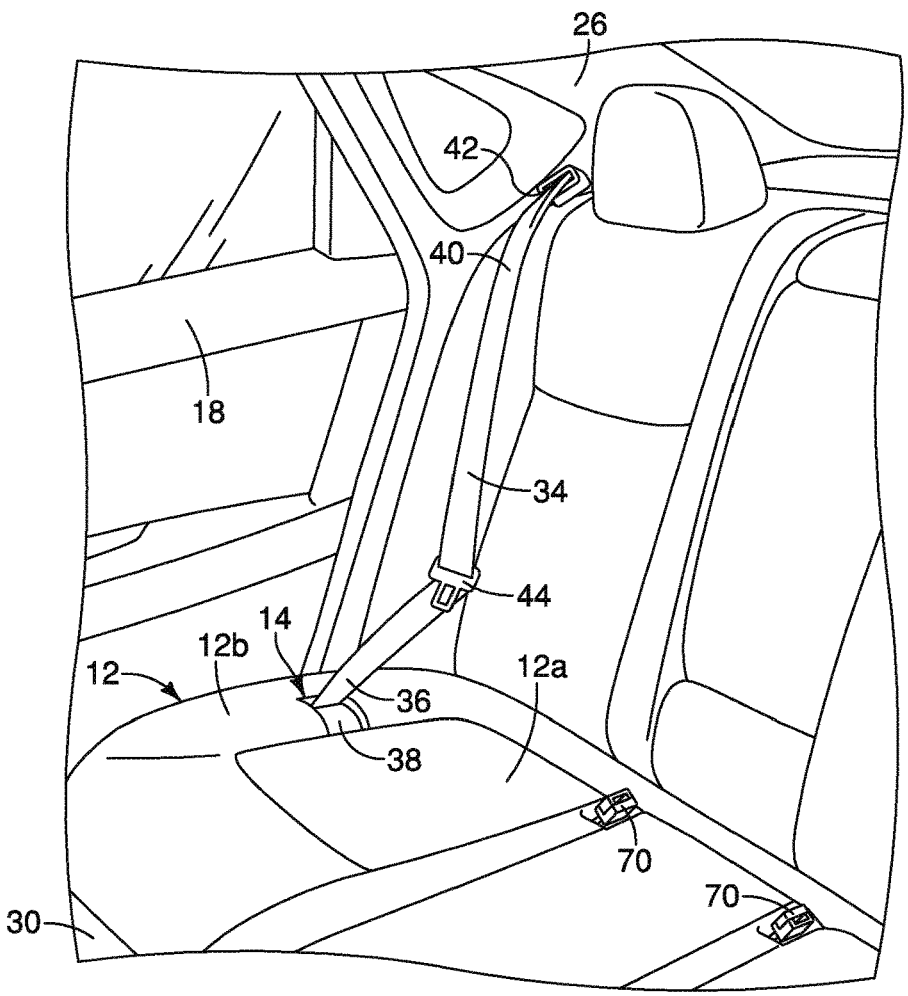
FIG. 2 is a perspective view of a portion of the rear seat in the passenger compartment showing the seat belt positioning mechanism in accordance with the exemplary embodiment.
Figure 3:
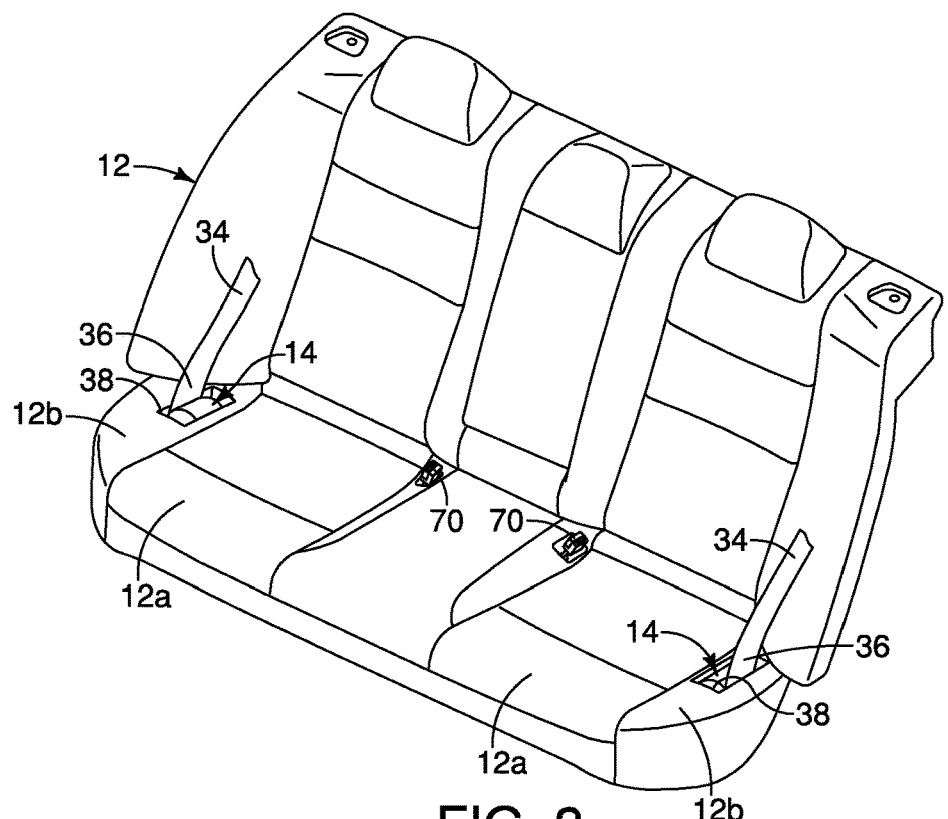
FIG. 3 is a perspective view of the rear seat removed from the vehicle showing two of the seat belt positioning mechanisms in accordance with the exemplary embodiment.

As shown in FIGS. 2 and 3 in the depicted first embodiment, the seat assembly 12 is installed within the passenger compartment of the vehicle 10 and is a bench-type seat with two laterally opposed main seating sections 12a. The seat assembly 12 also defines side seating sections 12b that extend laterally in outboard directions $D_O$ from corresponding ones of the main seating sections 12a.

As depicted in FIGS. 1 and 2, the vehicle 10 is a four-door sedan. When the rear door 18 is shut there is little, if any, space between the door 18 and an outboard end of the rear seat 12. In many sedans, the seat belt is attached to the floor in a space between the rear door 18. In the depicted embodiment of the invention 18, the seatbelt 34 is attached to the floor 30 of the vehicle 10 but does not extend along an outboard end of the rear seat 12, as is described further below.

As shown in FIG. 3, there are two main seating sections 12a and two corresponding seating sections 12b. The main seating sections 12a and side seating sections 12b are mirror images of one another but otherwise identical. Consequently, for purposes of understanding the seat belt positioning mechanism 14, description of only one of the main seating section 12a and corresponding one of the side seating sections 12b, is included herein below for the sake of brevity. More specifically, there are two seat belt positioning mechanisms 14 in the seat assembly 12. Only one of the two seat belt positioning mechanism 14 since one description applies equally to both.

A seat belt 34 is installed within the vehicle 10 with a lower section 36 extending through an opening 38 in the side seating section 12b of the seat assembly 12. The lower section 36 is further rigidly fixed to the floor structure 30, as shown in FIGS. 5-8. An upper section 40 of the seat belt 34 extends through an opening 42 in a trim panel covering the pillar structure 26 and to a seat belt retraction mechanism (not shown) that is located behind the trim panel covering the pillar structure 26. Since seat belt retraction mechanisms are conventional vehicle mechanism, further description is omitted for the sake of brevity. The seat belt 34 further includes a buckle member 44 that is installed to the seat belt 34 for sliding movement along the seat belt 34 in a conventional manner.

Figure 4:
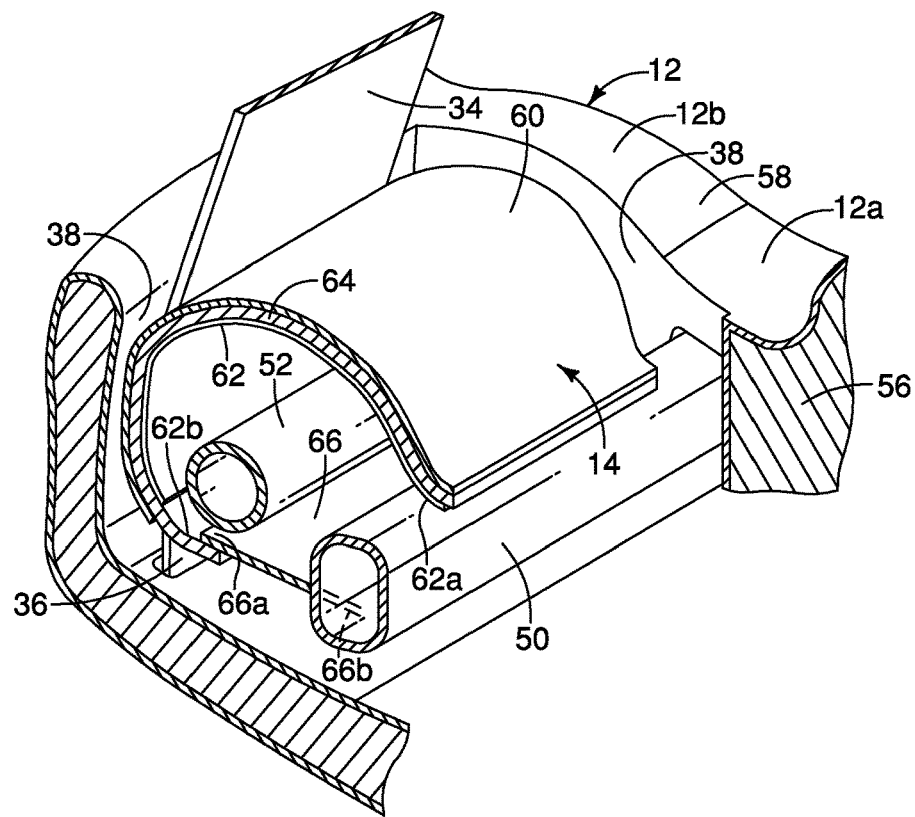
FIG. 4 is a perspective cross-sectional view of a portion of the rear seat showing details of the seat belt positioning mechanism including a cover extension, an elastic tensioning member, a resilient elongated substrate and a stop member in accordance with the exemplary embodiment.
Figure 5:
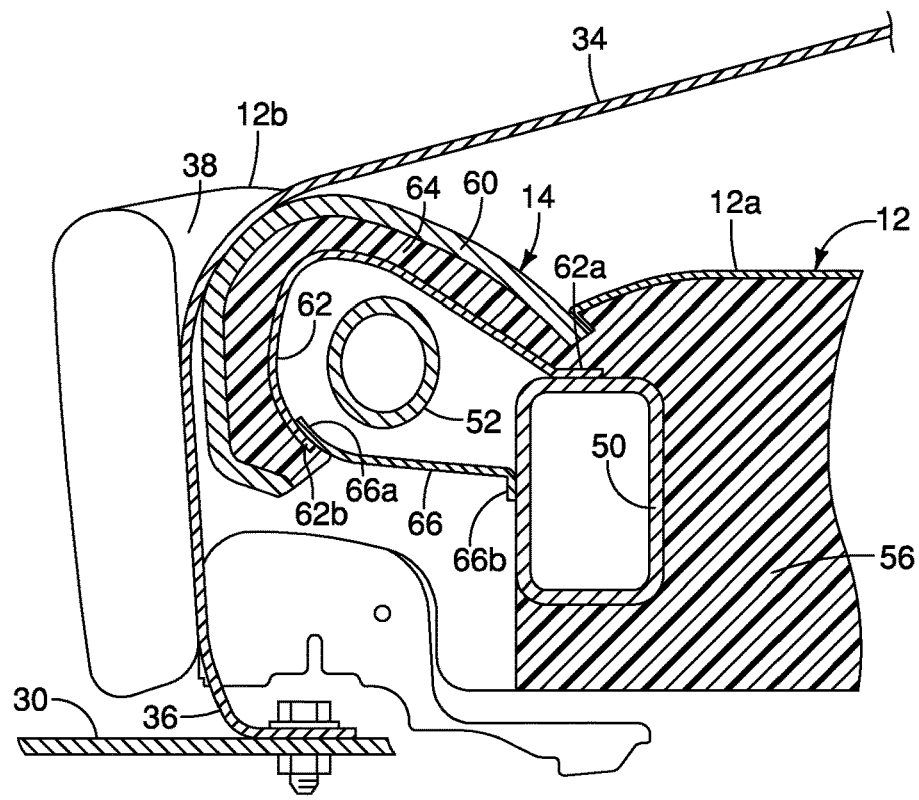
FIG. 5 is a cross-sectional view of the portion of the rear seat depicted in FIG. 4 showing details of the seat belt positioning mechanism including the cover extension, the elastic tensioning member, the resilient elongated substrate and the stop member with the elastic tensioning member in a fully extended orientation and the stop member in an elongated orientation in accordance with the exemplary embodiment.
Figure 6:
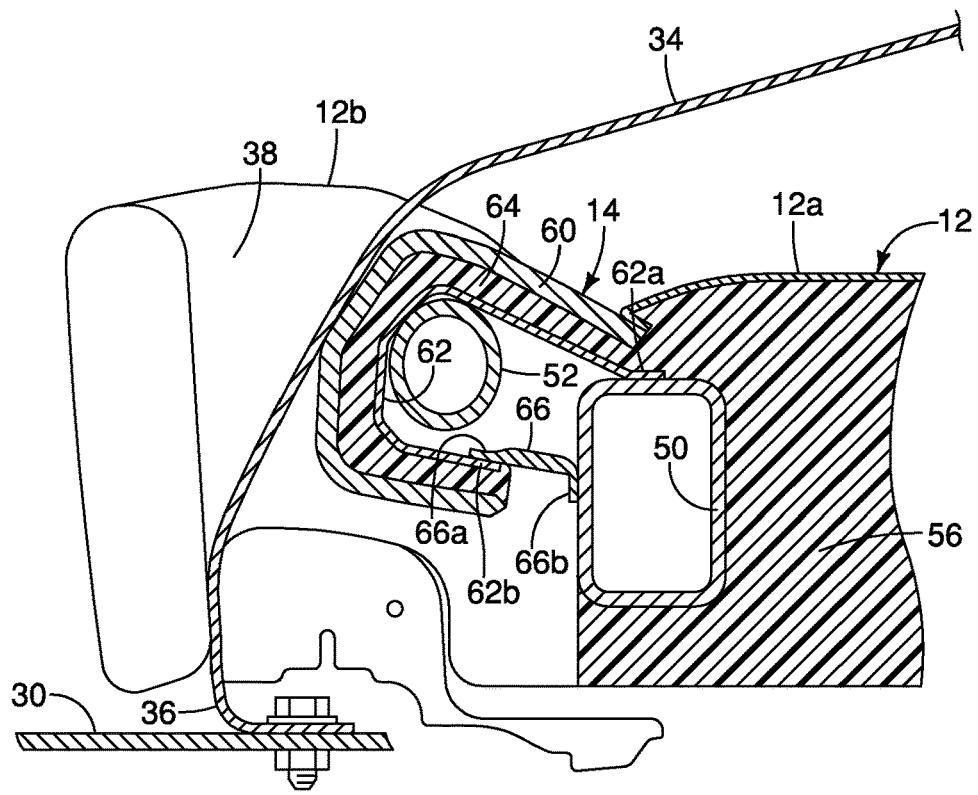
FIG. 6 is another cross-sectional view of the portion of the rear seat depicted in FIGS. 4 and 5 showing details of the seat belt positioning mechanism including the cover extension, the elastic tensioning member, the resilient elongated substrate and the stop member with the elastic tensioning member in a fully compressed orientation and the stop member in a retracted orientation in accordance with the exemplary embodiment.

As shown in FIGS. 4-6, the seat assembly 12 has a frame structure 48 that includes, among other elements, a first frame member 50 and a second frame member 52 that both extend in the vehicle longitudinal direction $D_L$. The first frame member 50 is preferably located proximate a laterally outboard area of the main seating section 12a. The second frame member 52 is preferably located outboard of the first frame member 50. The second frame member 52 is also preferably located adjacent to or within the opening 38, as shown in FIGS. 4-8, but is covered and concealed by elements of the seatbelt positioning mechanism 14, as described further below. The seat assembly 12 can further include an anti-submarining structure (not shown). Since anti-submarining structures and frame structures in general are conventional automotive structures, further description is omitted for the sake of brevity.

The seat assembly 12 further includes a cushion portion 56, a cover material 58 and the seat belt positioning mechanism 14.

As shown in FIGS. 4-6, the cushion portion 56 covers most portions of the frame structure 48 providing a comfortable material for a vehicle passenger to sit on. The cushion portion 56 also defines the opening 38 along with the cover material 58 such that the opening 38 extends through the side seating section 12b of the seat assembly 12.

The opening 38 extends from an upper exposed surface of the side seating section 12b of the seat assembly 12 to a lower area of the side seating section 12b of the seat assembly 12 and is open to the floor structure 30, as shown in in FIGS. 5 and 6. The cushion portion 56 is made of conventional seat cushion material and therefore further description of the cushion portion 56 is omitted for the sake of brevity.

The cover material 58 covers the cushion portion 56 providing the seat assembly 12 with an attractive appearance. The cover material 58 can be a textile material, leather, synthetic leather material or vinyl material. The cover material 58 includes a cover extension 60 that extends in the outboard direction from the main seating section 12a to the side seating section 12b, over a portion of the opening 38 and further downward into the opening 38 as shown in FIGS. 4, 5 and 6, and as described further below.

A description of the seat belt positioning mechanism 14 is now provided with specific reference to FIGS. 4-8. The seat belt positioning mechanism 14 is substantially located within the opening 38 extends to an area under the upper surface of the main seating area 12a, as described below. The seat belt positioning mechanism 14 basically includes the cover extension 60, an elastic tensioning member 62, a resilient elongated substrate 64 and a stop member 66.

The cover extension 60 is made of the same material as the cover material 58 and is preferably arranged and finished to blend in with the overall appearance of the side seating section 12b. The elastic tensioning member 62 can be any of a variety of biasing elements or structures. However, in the depicted embodiment, the elastic tensioning member 62 is a metallic plate that has been bent, treated and/or tempered such that the elastic tensioning member 62 initially has a curved contour, as shown in FIGS. 4 and 5. A first end 62a is fixedly and non-movably attached to an upper surface of the first frame member 50. Specifically, the first end 62a can be welded to the first frame member 50 or attached by mechanical fasteners (not shown). A mid portion of the elastic tensioning member 62 curves around the second frame member 50 with a second end 62b being located below the second frame member 50. The second end 62b of the elastic tensioning member 62 is further attached to a first end 66a of the stop member 66. A second end 66b the stop member 66 is fixedly attached to the first frame member 50.

The resilient elongated substrate 64 can be made of the same material as the cushion portion 56 or similar material. The resilient elongated substrate 64 is disposed between the elastic tensioning member 62 and the cover extension 60 for movement therewith. For example, the resilient elongated substrate 64 can be attached to the elastic tensioning member 62 and/or the cover extension 60 by adhesive or other appropriate material. One purpose of the resilient elongated substrate 64 is to conceal the metallic rigidity of the elastic tensioning member 62.

The elastic tensioning member 62 is dimensioned and shaped to bias the cover extension 60 in an upward direction and the outboard direction $D_O$ in order to at least partially cover and conceal the opening 38. Further, the elastic tensioning member 62 biases that portion of the seat belt 34 located within the opening 38.

Figure 7:
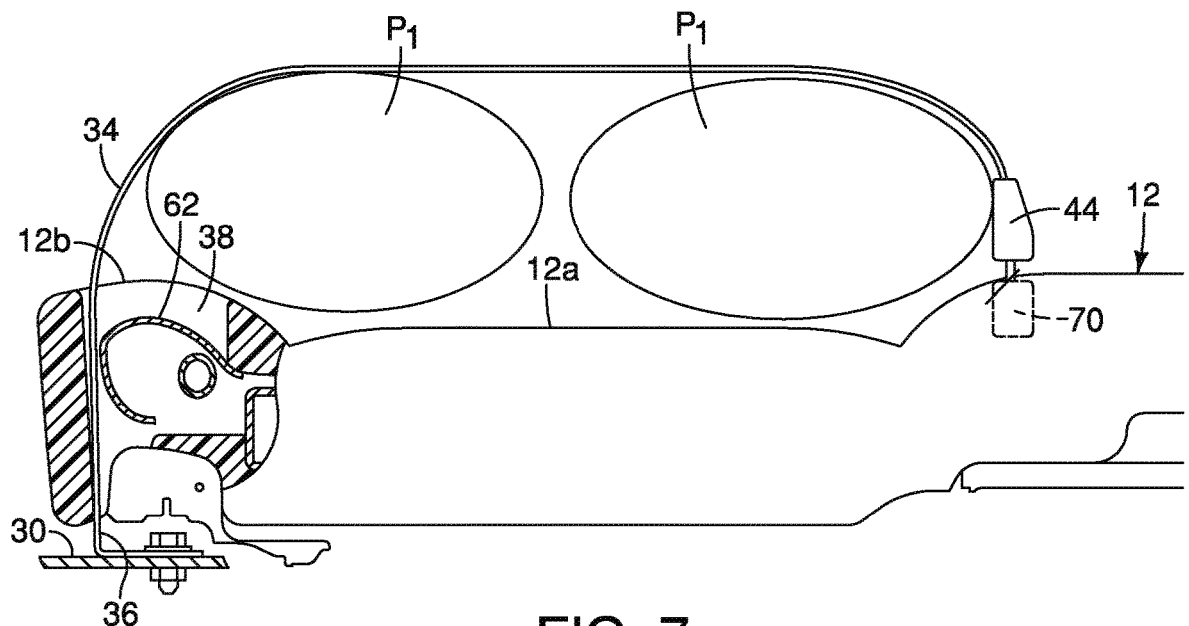
FIG. 7 is a schematic cross-sectional view of the rear seat with a large person seated on the rear seat showing the elastic tensioning member of the seat belt positioning mechanism in the elongated orientation with the cover extension, the resilient elongated substrate and the stop member removed for greater clarity, in accordance with the exemplary embodiment.

As shown in FIG. 5 (and schematically in FIG. 8), the elastic tensioning member 62 urges resilient elongated substrate 64, the cover extension 60 and the seat belt 34 to move to an outboard area of the opening 38. More specifically, elastic tensioning member 62 is shown in FIGS. 5 and 7 in a non-compressed state. With the elastic tensioning member 62 in the non-compressed state, the cover extension 60 covers a predetermined area of the opening 38. This predetermined area is also referred to herein below as a first area.

As shown in FIG. 7, in the non-compressed state, the seat belt 34 extends directly upward and can extend slightly in the inboard direction $D_I$ out of the opening 38 and comfortably curve to the shape of the thighs of a first passenger $P_1$. As shown in FIG. 7, the buckle member 44 of the seat belt 35 releasably locks into a seat belt latch mechanism 70 located in an inboard area of the seat assembly 12. More specifically, when a relatively large person such as the first passenger $P_1$ is seated on the main seating section 12a of the seat assembly 12, one of the thighs of the first passenger $P_1$ extends over onto the side seating section 12b. When the seat belt 34 is latched to the seat belt latch mechanism 70, the first passenger $P_1$ can be securely and comfortably seated with the elastic tensioning member 62 of the seat belt positioning mechanism 14 in the non-compressed state.

Figure 8:
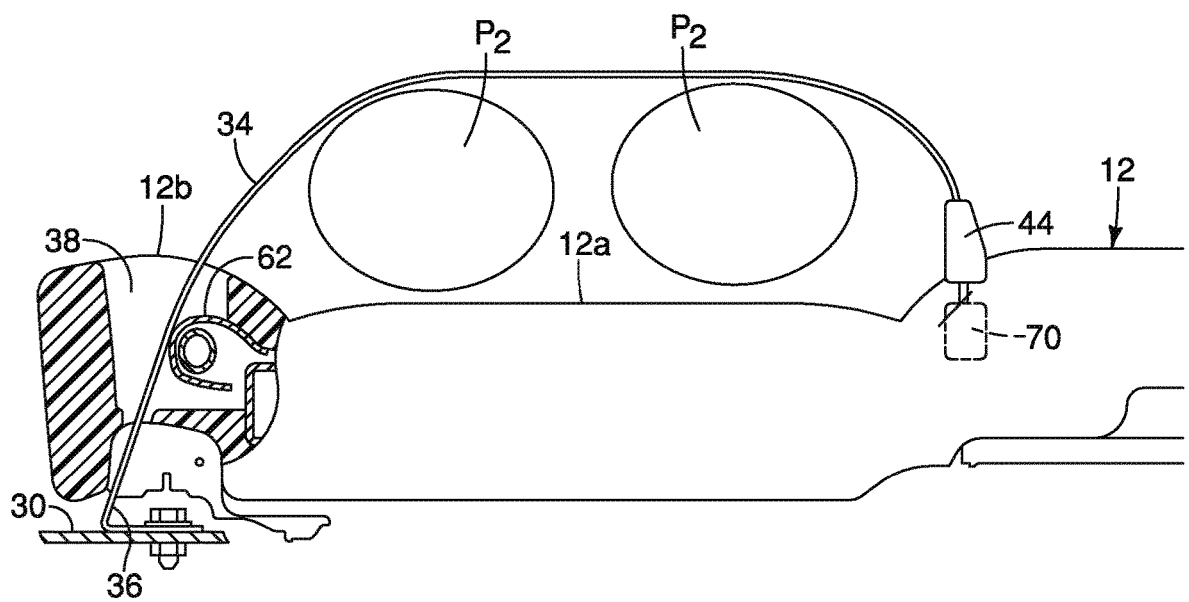
FIG. 8 is another schematic cross-sectional view of the rear seat with a small person seated on the rear seat showing the elastic tensioning member of the seat belt positioning mechanism in the fully compressed orientation with the cover extension, the resilient elongated substrate and the stop member removed for greater clarity, in accordance with the exemplary embodiment.

As shown in FIG. 6, the elastic tensioning member 62 is in a fully compressed orientation due to tightening of the seatbelt 34 around the thighs of a passenger $P_2$ (FIG. 8). More specifically, the elastic tensioning member 62 is shown in FIGS. 6 and 8 in a compressed state such that, the cover extension 60 covers only a portion of the predetermined area of the opening 38. In other words, the cover extension 60 covers a second area of the opening 38 that is less than the first area, leaving more of the opening 38 exposed than with the elastic tensioning member 62 in the non-compressed state.

As shown in FIG. 8, in the compressed state, the seat belt 34 extends slightly upward and in the inboard direction $D_I$ out of the opening 38 and comfortably curves to the shape of the thighs of a second passenger $P_2$. As shown in FIG. 8, the buckle member 44 of the seat belt 35 releasably locks into the seat belt latch mechanism 70 located in an inboard area of the seat assembly 12. More specifically, when a relatively person such as a second passenger $P_2$ smaller than the first passenger $P_1$ is seated on the main seating section 12a of the seat assembly 12, both of the thighs of the second passenger $P_2$ are located within the area above the main seating section 12a. When the seat belt 34 is latched to the seat belt latch mechanism 70, the second passenger $P_2$ can be securely and comfortably seated with the elastic tensioning member 62 of the seat belt positioning mechanism 14 in the compressed state. In the compressed state, the elastic tensioning member 62 is elastically deformed with the portion of the seat belt 34 located within the opening 38 pushing the elastic tensioning member 62 against the second frame member 52.

As shown in FIG. 5, the stop member 66 serves to restrict movement of the elastic tensioning member 62 of the seatbelt positioning mechanism 14 when in the non-compressed orientation. The stop member 66 can be a flexible strap the prevents movement of the second end 62b of the elastic tensioning member 62 from moving outboard any further than the location depicted in FIG. 5. Or, as show in FIGS. 5 and 6, the stop member 66 can be an elastic and resilient material. Specifically, the stop member 66 can stretch in response to non-compression of the elastic tensioning member 62, as shown in FIG. 5, thereby limiting movement of the second end 62b of the elastic tensioning member 62 in the outboard direction $D_O$. Further, when the elastic tensioning member 62 is compressed, the stop member 66 is no longer stretched and retracts to the length shown in FIG. 6.

Put another way, with the elastic tensioning member 62 in a non-compressed orientation, as shown in FIG. 5, the part of the seat belt 34 located within the opening 38 is in an outboard area of the opening 38 (a first area). With the elastic tensioning member 62 being compressed by tension on the seat belt 34, the part of the seat belt 34 located within the opening is located within an inboard area of the opening 38 (a second area of the opening 38 inboard of the first area).

Second Embodiment

Figure 9:
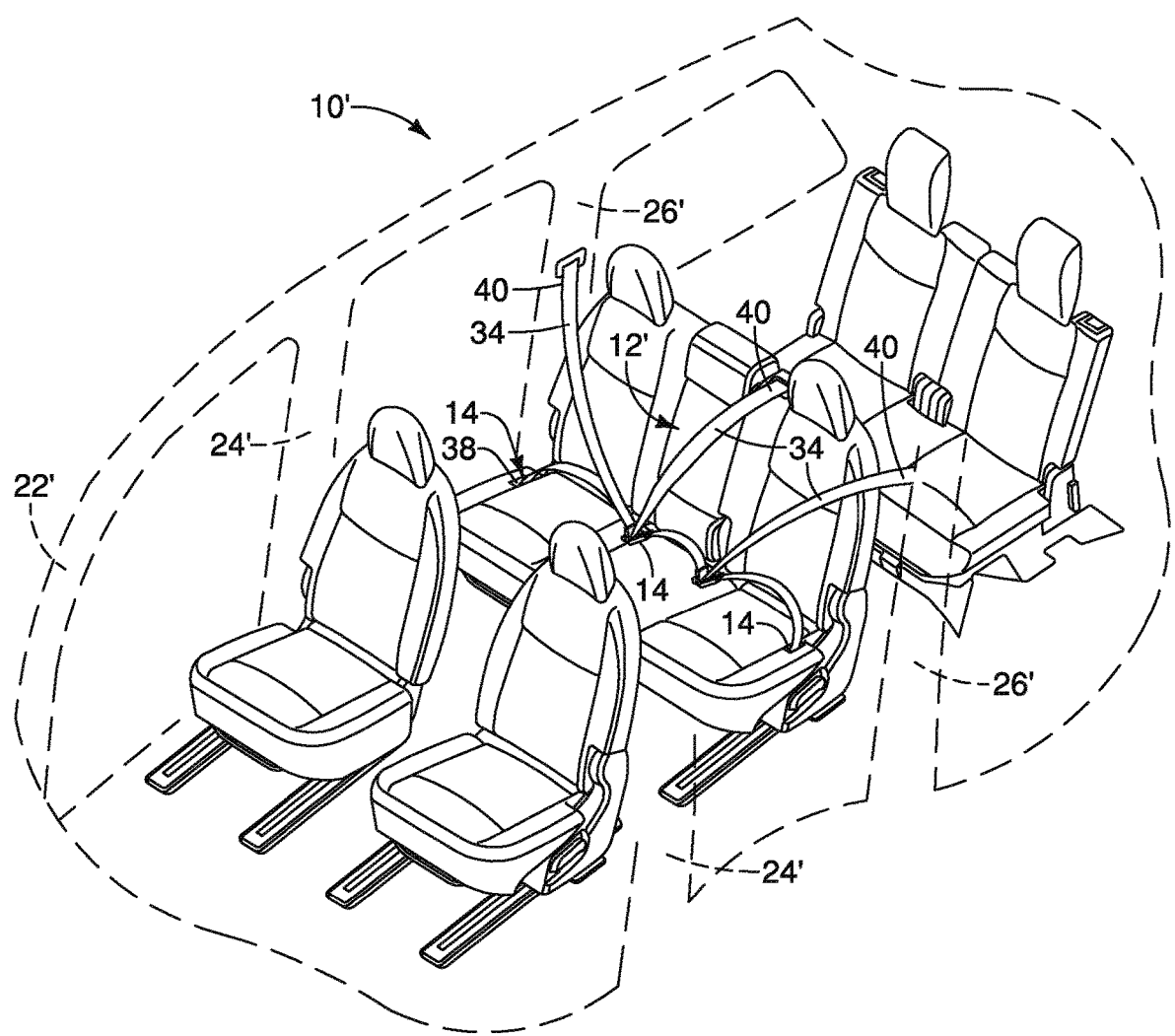
FIG. 9 is a perspective view of a vehicle with a free-standing seat assembly that includes several seat belt positioning mechanisms in accordance with a modification of the exemplary embodiment.

Referring now to FIG. 9, a seat assembly 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the vehicle 10' includes pillars 22, 24 and 26 and the seat assembly 12'. The vehicle 10' is a large SUV or van. The seat assembly 12' is installed within a passenger compartment of the vehicle 10' and includes seat belts 34, openings 38 in the seat assembly 12' and a plurality of the seat belt positioning mechanisms 14. The seat assembly 12' is spaced apart from the floor. In the depicted second embodiment, the lower sections (not shown) of the seat belts 34 are fixed to an underside of the seat assembly 12', not to the floor. The seat assembly 12' includes a sliding mechanism such that the seat assembly 12' can be moved forward and rearward within the passenger compartment of the vehicle.

The operation and function of the seat belt positioning mechanisms 14 in the second embodiment are identical to that described above with reference to the first embodiment.

The various elements and structures of the vehicle 10 (other than the seat assemblies 12 and 12' and the seat belt positioning mechanisms 14) are conventional automotive components that are well known in the art. Since such conventional automotive components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section." "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the seat belt positioning mechanism. Accordingly, these terms, as utilized to describe the present invention should be interpreted relative to a vehicle equipped with the seat belt positioning mechanism.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A seat belt positioning mechanism, comprising
a vehicle seat having a frame structure, a cushion portion covering the frame structure and a cover material covering the cushion portion, the cushion portion defining a main seating section and an outboard side seat section extending laterally outboard from a corresponding side of the main seating section, the side seat section defining an opening extending through the cushion portion, the opening being dimensioned to receive a seat belt extending therethrough, the cover material having a cover extension extending into the opening; and
an elastic tensioning member having a first end fixed to the frame structure and extending under the cover extension into the opening, the elastic tensioning member being dimensioned and shaped to bias the cover extension in an outboard direction against a part of the seat belt located within the opening, the biasing of the elastic tensioning member being such that with the elastic tensioning member in a non-compressed state, the part of the seat belt is located within a first area of the opening, and with the elastic tensioning member being compressed by the part of the seat belt, the part of the seat belt is located within a second area of the opening inboard of the first area.

2. The seat belt positioning mechanism according to claim 1, wherein
with the seat belt extending upward from the opening and with the elastic tensioning member in a non-compressed state, the cover extension covers a predetermined area of the opening, and
with the seat belt tensioned and compressing the elastic tensioning member with the seat belt extending toward and over the main seating section, the cover extension covers a reduced portion of the predetermined area of the opening.

3. The seat belt positioning mechanism according to claim 1, wherein
the frame structure includes a frame member, the first end of the elastic tensioning member being attached to the frame member, and the frame member being located adjacent to the opening.

4. The seat belt positioning mechanism according to claim 1, further comprising
a resilient elongated substrate disposed between the elastic tensioning member and the cover extension for movement therewith.

5. A seat belt positioning mechanism, comprising
a vehicle seat having a frame structure, a cushion portion covering the frame structure and a cover material covering the cushion portion, the cushion portion defining a main seating section and an outboard side seat section extending laterally outboard from a corresponding side of the main seating section, the side seat section defining an opening extending through the cushion portion, the opening being dimensioned to receive a seat belt extending therethrough, the cover material having a cover extension extending into the opening, the frame structure includes a frame member; and
an elastic tensioning member having a first end fixed to the frame structure and extending under the cover extension into the opening, the elastic tensioning member being dimensioned and shaped to bias the cover extension in an outboard direction against a part of the seat belt located within the opening, the first end of the elastic tensioning member being fixed to a first location on the frame member, and a distal end of the elastic tensioning member being fixed to a stop member that is attached to a second location on the frame member spaced apart from the first location.

6. The seat belt positioning mechanism according to claim 5, wherein
the stop member is dimensioned and located to limit outboard movement of the elastic tensioning member.

7. The seat belt positioning mechanism according to claim 5, wherein
the stop member is an elastic strap.

8. A seat belt positioning mechanism, comprising
a vehicle seat having a frame structure, a cushion portion covering the frame structure and a cover material covering the cushion portion, the cushion portion defining a main seating section and side seat sections extending laterally from respective opposing sides of the main seating section, one of the side seat sections defining an opening extending through the cushion portion, the opening being dimensioned to receive a seat belt extending therethrough, the cover material having a cover extension extending into the opening; and
an elastic tensioning member having a first end fixed to a frame member of the frame structure and extending under the cover extension into the opening, the elastic tensioning member being dimensioned and shaped to bias the cover extension against a part of the seat belt located within the opening such that with the seat belt extending upward from the opening, the cover extension covers a predetermined area of the opening, and, with the seat belt tensioned and extending toward and over the main seating section the part of the seat belt located within the opening presses against the cover extension and the elastic tensioning member compressing the elastic tensioning member such that the cover extension covers a reduced portion of the predetermined area of the opening.

9. The seat belt positioning mechanism according to claim 8, wherein
the frame member of the frame structure is located adjacent to the opening.

10. The seat belt positioning mechanism according to claim 8, further comprising
a resilient elongated substrate disposed between the elastic tensioning member and the cover extension for movement therewith.

11. The seat belt positioning mechanism according to claim 8, wherein
the elastic tensioning member is configured to bias the part of the seat belt located within the opening in a direction away from the main seating section of the cushion portion.

12. The seat belt positioning mechanism according to claim 8, wherein
the opening is located outboard of the main seating section of the cushion portion.

13. The seat belt positioning mechanism according to claim 8, wherein
the first end of the elastic tensioning member is fixed to a first location on the frame member, and
a distal end of the elastic tensioning member is fixed to a stop member that is attached to a second location on the frame member spaced apart from the first location.

14. The seat belt positioning mechanism according to claim 13, wherein
the stop member is dimensioned and located to limit movement of the elastic tensioning member in a direction extending away from the frame member.

15. The seat belt positioning mechanism according to claim 13, wherein
the stop member is an elastic strap.

16. The seat belt positioning mechanism according to claim 13, wherein
the stop member limit movements of the elastic tensioning member in a direction extending away from the main seating section of the cushion portion.

* * * * *